(12) United States Patent
Zhou et al.

(10) Patent No.: US 10,406,799 B1
(45) Date of Patent: Sep. 10, 2019

(54) FILM SEPARATION APPARATUS AND FILM SEPARATION METHOD

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Zhenli Zhou, Beijing (CN); Ting Wang, Beijing (CN); Zhiliang Jiang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 16/140,137

(22) Filed: Sep. 24, 2018

(30) Foreign Application Priority Data

Mar. 30, 2018 (CN) .......................... 2018 1 0276550

(51) Int. Cl.
*B32B 43/00* (2006.01)
*B25J 18/00* (2006.01)
*B29C 63/00* (2006.01)

(52) U.S. Cl.
CPC ............. *B32B 43/006* (2013.01); *B25J 18/00* (2013.01); *B29C 63/0013* (2013.01); *B32B 2457/202* (2013.01); *B32B 2457/206* (2013.01); *Y10S 156/93* (2013.01); *Y10S 156/943* (2013.01); *Y10T 156/1184* (2015.01); *Y10T 156/1983* (2015.01)

(58) Field of Classification Search
CPC ............. B32B 43/006; Y10T 156/1179; Y10T 156/1184; Y10T 156/1983; Y10S 156/93; Y10S 156/941; Y10S 156/943
See application file for complete search history.

(56) References Cited

U.S. PATENT DOCUMENTS

| | | | | |
|---|---|---|---|---|
| 4,867,837 A * | 9/1989 | Seki | .................... | B29C 63/0013 156/754 |
| 5,679,210 A * | 10/1997 | Thomas | .................. | A47L 13/08 156/709 |
| 8,991,463 B2 * | 3/2015 | Jeong, II | ............. | B29C 63/0013 156/715 |
| 2004/0026045 A1 * | 2/2004 | Adleman, Jr. | .......... | B66F 15/00 156/763 |
| 2015/0319893 A1 * | 11/2015 | Ohno | .................... | B32B 43/006 156/702 |

FOREIGN PATENT DOCUMENTS

WO  WO-2011077854 A1 *  6/2011  ........... B32B 43/006

* cited by examiner

*Primary Examiner* — Mark A Osele
(74) *Attorney, Agent, or Firm* — Ladas Parry LLP

(57) ABSTRACT

A film separation apparatus and a film separation method are disclosed. The film separation apparatus includes a mechanical arm, a needle and a stopping member; the needle has one end connected to the mechanical arm and the other end including a needle tip; the stopping member includes a connecting rod and a stopper, the connecting rod has one end connected to the mechanical arm and the other end connected to the stopper, the needle tip is configured to be inserted into a film to be separated, the stopper and the needle tip are configured to move with respect to each other in an extension direction of the needle so as to separate the film to be separated from the needle tip.

17 Claims, 5 Drawing Sheets

FILM SEPARATION APPARATUS AND FILM SEPARATION METHOD

The present disclosure claims the benefits of Chinese patent application No. 201810276550.4, filed on Mar. 30, 2018, the entire disclosure of which is incorporated herein by reference as part of the present application.

TECHNICAL FIELD

Embodiments of the present disclosure provide a film separation apparatus and a film separation method.

BACKGROUND

With continuous development of scientific and technological level, liquid crystal display (LCD) device and organic light-emitting diode (OLED) display device have become mainstreams of display devices.

In a manufacturing process of the LCD device and the OLED display device, a packaging protective film is usually used for protecting a film layer to be protected. As a result, when using the film layer to be protected, it's required to utilize a film separation apparatus to separate and remove the packaging protective film.

SUMMARY

At least one embodiment of the present disclosure provides a film separation apparatus, including a mechanical arm; a needle having one end connected to the mechanical arm and the other end including a needle tip; and a stopping member including a connecting rod and a stopper, the connecting rod having one end connected to the mechanical arm and the other end connected to the stopper, wherein the needle tip is configured to be inserted into a film to be separated, the stopper and the needle tip are configured to move with respect to each other in an extension direction of the needle so as to separate the film to be separated from the needle tip.

For example, the film separation apparatus provided by an embodiment of the present disclosure further includes a driving device disposed on the mechanical arm, the driving device is configured to drive at least one of the stopper and the needle tip so that the stopper and the needle tip move with respect to each other in the extension direction of the needle.

For example, in the film separation apparatus provided by an embodiment of the present disclosure, the stopping member is fixed on the mechanical arm, the film separation apparatus further includes a first driving device which is disposed on the mechanical arm and is configured to drive the needle tip to move along the extension direction of the needle so as to move with respect to the stopper in the extension direction of the needle to separate the film to be separated from the needle tip.

For example, in the film separation apparatus provided by an embodiment of the present disclosure, the needle is fixed on the mechanical arm, the film separation apparatus further includes a second driving device configured to drive the stopper to move so as to move with respect to the needle tip in the extension direction of the needle to separate the film to be separated from the needle tip.

For example, in the film separation apparatus provided by an embodiment of the present disclosure, the second driving device is disposed in the connecting rod, and the second driving device is configured to drive the stopper to move along an extension direction of the connecting rod.

For example, in the film separation apparatus provided by an embodiment of the present disclosure, a minimum distance between the stopper and the needle tip is smaller than 20 mm.

For example, in the film separation apparatus provided by an embodiment of the present disclosure, the stopper includes a stop ring, the extension direction of the needle passes through the stop ring, and the needle tip is configured to be capable of passing through the stop ring.

For example, the film separation apparatus provided by an embodiment of the present disclosure further includes a clamping member which is disposed on the mechanical arm and is configured to clamp the film to be separated.

For example, in the film separation apparatus provided by an embodiment of the present disclosure, the clamping member includes: a first clamping rod fixed with the mechanical arm; a second clamping rod hinged with the first clamping rod; and a first electric motor configured to drive one end of the second clamping rod far away from a hinged position to rotate about the hinged position.

For example, in the film separation apparatus provided by an embodiment of the present disclosure, the first electric motor is disposed at a hinged position where the first clamping rod is hinged with the second clamping rod.

For example, in the film separation apparatus provided by an embodiment of the present disclosure, the clamping member further includes: a second electric motor which is disposed at one end of the second clamping rod close to the hinged position and is configured to drive the second clamping rod to revolve on its own axis.

For example, the film separation apparatus provided by an embodiment of the present disclosure further includes an adsorption device which is disposed on the mechanical arm and is configured to generate an adsorption force to adsorb a particle.

At least one embodiment of the present disclosure further provides a film separation method, including: inserting a needle tip of a needle into a film to be separated on a substrate; moving the needle to cause an upwarp portion in the film to be separated; moving the needle to drag the film to be separated so as to separate the film to be separated from the substrate; and driving a stopper and the needle tip to move with respect to each other in an extension direction of the needle so as to separate the film to be separated from the needle tip.

For example, the film separation method provided by an embodiment of the present disclosure further includes: after moving the needle to cause an upwarp portion in the film to be separated, clamping the upwarp portion by using a clamping member.

For example, in the film separation method provided by an embodiment of the present disclosure, driving a stopper and the needle tip to move with respect to each other in an extension direction of the needle so as to separate the film to be separated from the needle tip includes: driving the needle tip to move along the extension direction of the needle so as to move with respect to the stopper to separate the film to be separated from the needle tip.

For example, in the film separation method provided by an embodiment of the present disclosure, driving a stopper and the needle tip to move with respect to each other in an extension direction of the needle so as to separate the film to be separated from the needle tip includes: driving the stopper to move so as to move with respect to the needle tip in the extension direction of the needle to separate the film to be separated from the needle tip.

For example, in the film separation method provided by an embodiment of the present disclosure, the stopper includes a stop ring, the extension direction of the needle passes through the stop ring, and the needle tip passes through the stop ring while the stopper and the needle tip moving with respect to each other.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, technical solutions according to the embodiments of the present disclosure will be described clearly and completely as below in conjunction with the accompanying drawings of embodiments of the present disclosure. It is to be understood that the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not intended to define a physical connection or mechanical connection, but may include an electrical connection/coupling, directly or indirectly.

Usually, after half cutting a top protection film on a panel by using cutting process, it needs to perform a peeling process to remove a portion of the top protection film at an edge of the panel. However, the inventors of the present application has noticed that, after separating a glue material of the top protection film to be separated from the panel and transporting the glue material to a waste port by using a needle tip and a clamping member, part of the glue material of the top protection film may be adhered to the needle tip and the clamping member, which influences subsequent processes; or, such glue material adhered to the needle tip and the clamping member may be dropped onto a stage of the machine, which influences subsequent processes, resulting in various adverse effects. On the other hand, during half cutting the top protection film on the panel by using cutting process, a portion of the top protection film corresponding to a position of a half cutting line would be subjected to a carbonization and generate particles; moreover, these particles, when dropped onto a pin, may result in various defects of the panel.

Figure 1:
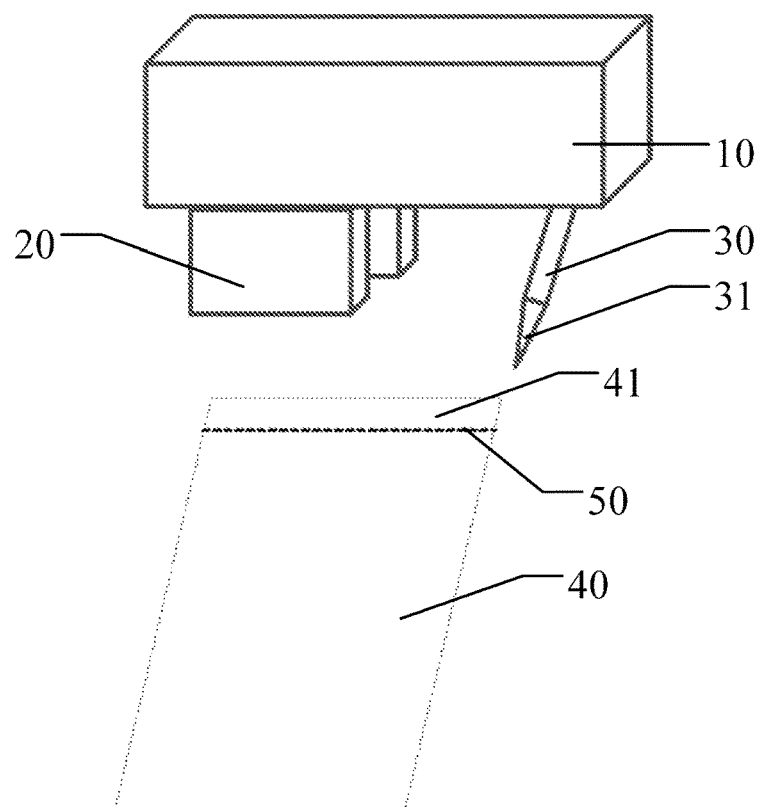
FIG. 1 is a schematic diagram illustrating a film separation apparatus separating a film to be separated.

FIG. 1 is a schematic diagram illustrating a film separation apparatus separating a film to be separated. As illustrated in FIG. 1, the film separation apparatus includes a mechanical arm 10, a clamping member 20 disposed on the mechanical arm 10, and a needle 30 disposed on the mechanical arm 10; an end of the needle 30 far away from the mechanical arm 10 is provided with a needle tip 31. As illustrated in FIG. 1, a film 40 is disposed on a substrate, and an upper portion of the film 40 that is to be cut along a cutting line 50 is referred to as a film 41 to be separated. When the above-mentioned film separation apparatus is used for separating the film 41 to be separated, it's possible to, firstly, insert the needle tip 31 into the film 41 to be separated, and drive the needle 30 to move horizontally by the mechanical arm 10 to cause an upwarp portion or a protrusion in the film 41 to be separated, then clamp the upwarp portion or the protrusion by the clamping member 20, and finally drive the clamping member 20 and the needle tip 31 by the mechanical arm 10 to separate the film 41 to be separated from the substrate and transport the same to a waste port.

However, after separating the film 41 to be separated from the substrate and transporting the same to the waste port by the needle tip 31 and the clamping member 20, a portion of the film 41 to be separated may be adhered to the needle tip 31 and the clamping member 20, which influences subsequent processes; or such portion of film 41 to be separated that is adhered to the needle tip 31 and the clamping member 20 may be dropped onto a stage of the machine, which influences subsequent processes, resulting in various adverse effects. On the other hand, during half cutting the film 40 on the substrate by using cutting process, a portion of the film 40 corresponding to a position of a half cutting line would be subjected to a carbonization and generate particles; moreover, these particles, when dropped onto a pin, may cause various defects of the panel.

Embodiments of the present disclosure provide a film separation apparatus and a film separation method. The film separation apparatus includes a mechanical arm, a needle and a stopping member; the needle has one end connected to the mechanical arm and the other end provided with a needle tip; the stopping member includes a connecting rod and a stopper, the connecting rod having one end connected to the mechanical arm and the other end connected to the stopper; the needle tip is configured to be inserted into a film to be separated; the stopper and the needle tip are configured to move with respect to each other in an extension direction of the needle so as to separate the film to be separated from the needle tip. In this way, by an arrangement of the stopper and by utilizing the relative movement of the stopper and the needle tip in the extension direction of the needle, the film separation apparatus allows separating the film to be separated from the needle tip, so as to prevent the film to be separated from adhering to the needle tip and avoid various defects caused thereby.

Hereinafter, the film separation apparatus and the film separation method provided by the embodiment of the present disclosure will be described with reference to the drawings.

Figure 2A:
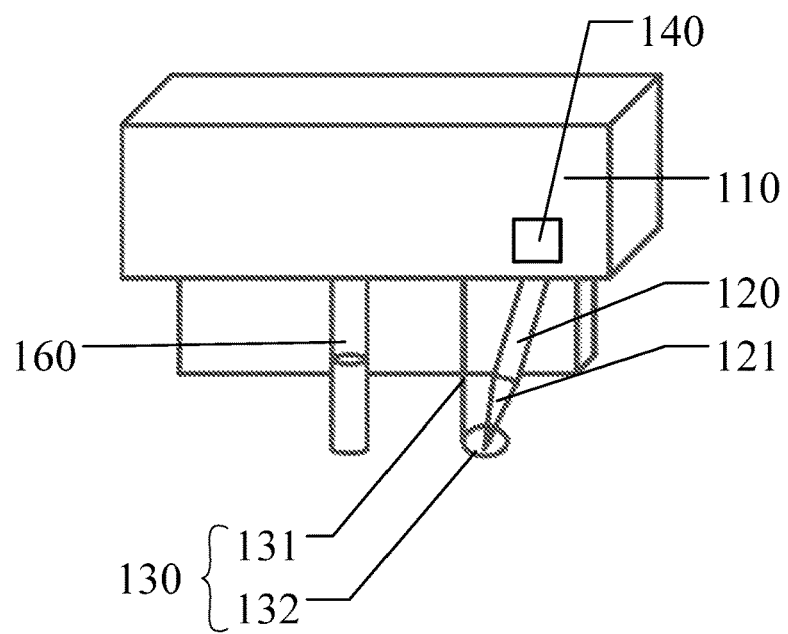
FIG. 2A is a film separation apparatus provided by an embodiment according to the present disclosure.

FIG. 2A illustrates a film separation apparatus provided by an embodiment of the present disclosure. As illustrated in FIG. 2A, the film separation apparatus 100 includes a mechanical arm 110, a needle 120 and a stopping member 130; the needle 120 has one end connected to the mechanical arm 110 and the other end provided with a needle tip 121; the stopping member 130 includes a connecting rod 131 and a stopper 132, the connecting rod 131 has one end connected to the mechanical arm 110 and the other end connected to the stopper 132; the needle tip 121 can be inserted into a film to be separated; the stopper 132 and the needle tip 121 can move with respect to each other in the extension direction of the needle 120 so as to separate the film to be separated from the needle tip. It should be explained that, the above-mentioned relative movement not only includes a movement along the extension direction of the needle 120 but also includes movements along other directions, as long as the movement has a component in the extension direction of the needle 120.

When the film separation apparatus provided by the embodiment of the present disclosure is used for separating a film (e.g., a top protection film) to be separated on a substrate (e.g., display panel), it's possible to, firstly insert the needle tip 121 into the film to be separated, and then move the needle 120 horizontally by the mechanical arm 110 to cause an upwarp portion or a protrusion in the film to be separated. After separating the film to be separated from the substrate and transporting the same to the waste port, it's possible to drive the stopper and the needle tip to move with respect to each other along the extension direction of the needle so as to separate the film to be separated from the needle tip. In this way, by an arrangement of the stopper and by utilizing the relative movement of the stopper and the needle tip in the extension direction of the needle, the film separation apparatus allows separating the film to be separated from the needle tip, so as to prevent the film to be separated from adhering to the needle tip and avoid various defects caused thereby.

For example, in some examples, a minimum distance between the stopper 132 and the needle tip 121 is smaller than 20 mm. Thus it can ensure that the stopper 132 can separate the film to be separated on the needle tip 121 from the needle tip. It should be explained that the minimum distance between the stopper and the needle tip refers to a distance between a portion of the stopper closest to the needle tip and the needle tip when the stopper and the needle are located in a same plane parallel to the substrate. For example, in some examples, as illustrated in FIG. 2A, the stopping member 130 is fixed on the mechanical arm 110, the film separation apparatus 100 further includes a first driving device 140 which is disposed on the mechanical arm 110 and can drive the needle tip 121 to move along the extension direction of the needle 120, so as to move with respect to the stopper 132 in the extension direction of the needle 120 to separate the film to be separated from the needle tip 121. That is to say, the stopping member 130 is fixed with respect to the mechanical arm 110, and the needle tip 121 can move with respect to the stopper 132 under the drive of the first driving device 140. Because the stopping member 130 can be fixed on the mechanical arm 110, it has a simple structure, so as to reduce the cost of the film separation apparatus.

For example, in some examples, as illustrated in FIG. 2A, the stopper 132 includes a stop ring, the extension direction of the needle 120 passes through the stop ring, and the needle tip can pass through the stop ring. In this way, after passing through the stop ring, the needle tip can be inserted into the film to be separated; after retracting the needle tip to a side of the stop ring far away from the film to be separated and holding the needle tip there, the stop ring can block the film to be separated on the needle tip, so as to separate the film to be separated from the needle tip, which can prevent the film to be separated from adhering to the needle tip and avoid various defects caused thereby.

For example, the above-mentioned stop ring can have a shape including circle, polygon, ellipse and the like.

For example, when the above-mentioned stop ring has a circle shape, a radius of the stop ring is smaller than 20 mm.

Figure 2B:
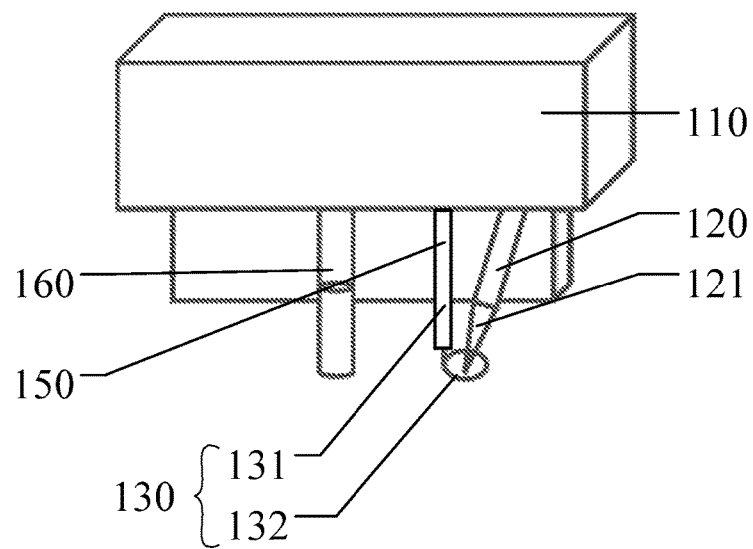
FIG. 2B is another film separation apparatus provided by an embodiment according to the present disclosure.

FIG. 2B illustrates another film separation apparatus provided by an embodiment of the present disclosure. As illustrated in FIG. 2B, the needle 120 is fixed on the mechanical arm 110, the film separation apparatus 100 further includes a second driving device 150 which can drive the stopper 132 to move, so as to move with respect to the needle tip 121 in the extension direction of the needle 120 to separate the film to be separated from the needle tip 121. That is to say, the needle 120 is fixed with respect to the mechanical arm 110, and the stopper 132 can move with respect to the needle tip 121 under the drive of the second driving device 150. When the needle 120 is fixed with respect to the mechanical arm 110, the needle tip 121 can be inserted into the film to be separated by utilizing a movement of the mechanical arm 110 in a direction perpendicular to the film to be separated.

For example, in some examples, as illustrated in FIG. 2B, the second driving device 150 is disposed in the connecting rod 131, and the second driving device 150 can drive the stopper 132 to move along an extension direction of the connecting rod 131. Because the second driving device can be disposed in the connecting rod, a volume and an integration level of the film separation apparatus can be reduced.

For example, the second driving device 150 can include a driving device such as a hydraulic cylinder.

For example, embodiments including the first driving device and the second driving device respectively have been introduced above, but the embodiment of the present disclosure is not limited thereto. Any driving device disposed on the mechanical arm that can drive at least one of the stopper and the needle tip can allow the stopper and the needle tip to move with respect to each other in the extension direction of the needle.

For example, in some examples, as illustrated in FIG. 2A and FIG. 2B, the film separation apparatus further includes a clamping member 160 which is disposed on the mechanical arm 110 and can clamp the film to be separated.

Figure 3:
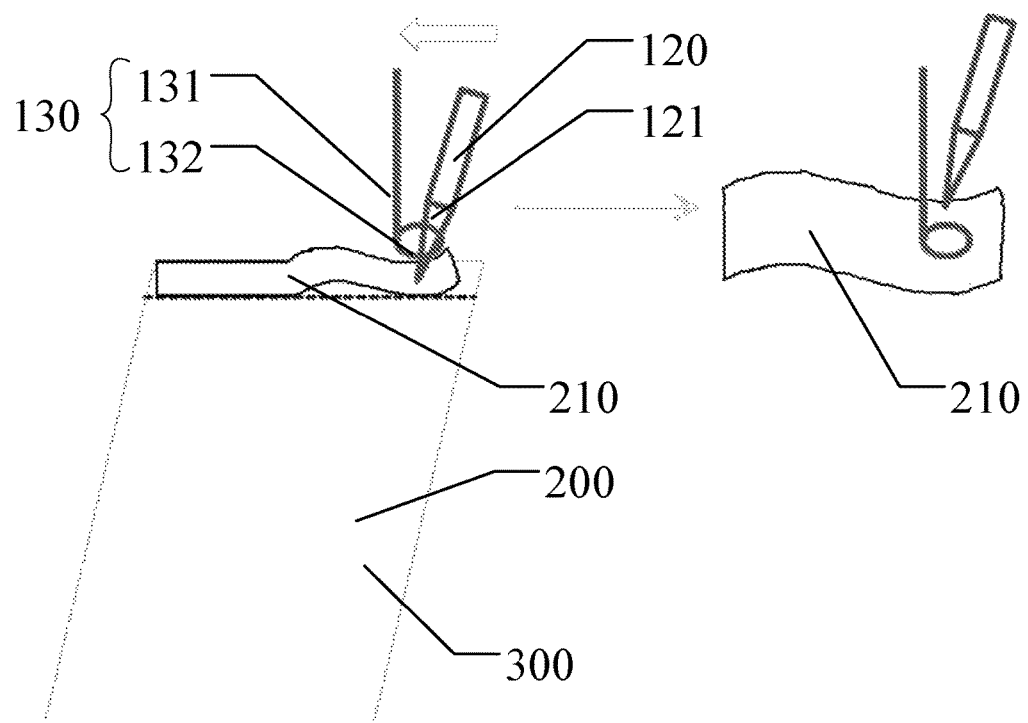
FIG. 3 is a schematic diagram illustrating a film separation apparatus provided by an embodiment according to the present disclosure separating a film to be separated.

FIG. 3 is a schematic diagram illustrating a film separation apparatus provided by an embodiment according to the present disclosure separating a film to be separated. As illustrated in FIG. 3, a film 200 is disposed on a substrate 300, and an upper portion of the film 200 that is isolated by a cutting line is referred to as a film 210 to be separated. It's possible to, firstly, insert the needle tip 121 into the film 210 to be separated, and then drive the needle 120 to move horizontally by the mechanical arm 110 to cause an upwarp portion or a protrusion in the film 210 to be separated. At this moment, clamping the upwarp portion or the protrusion by the clamping member 160, and then completely separating the film 210 to be separated from the substrate 300 by the needle 121 and the clamping member 160 which are driven by the mechanical arm 110; moreover, after transporting the film 210 to be separated to the waste port, driving the stopper 132 and the needle tip 121 to move with respect to each other in the extension direction of the needle 120 so as to separate the film 210 to be separated from the needle tip 121.

Figure 4A:
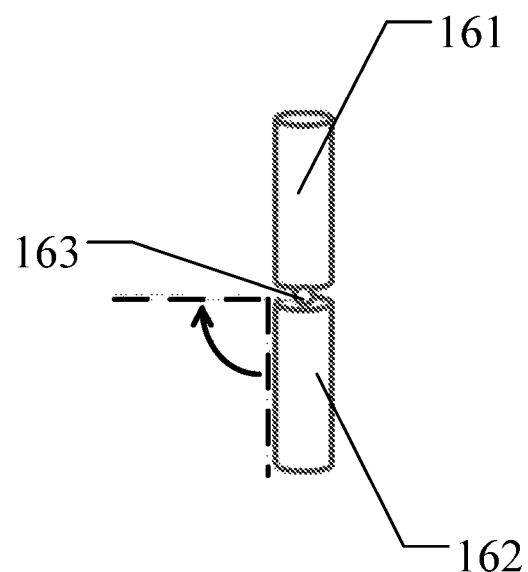
FIG. 4A is a schematic diagram illustrating a clamping member in a film separation apparatus provided by an embodiment according to the present disclosure.

FIG. 4A is a schematic diagram illustrating a clamping member in a film separation apparatus provided by an embodiment according to the present disclosure. As illustrated in FIG. 4A, the clamping member 160 can include a first clamping rod 161, a second clamping rod 162, and a first electric motor 163; the first clamping rod 161 is fixed with the mechanical arm 110; the second clamping rod 162 is hinged with the first clamping rod 161; the first electric motor 163 is disposed at a hinged position where the first clamping rod 161 is hinged with the second clamping rod 162, and can drive an end of the second clamping rod 162 far away from the hinged position to rotate about the hinged position; that is to say, the end of the second clamping rod 162 far away from the hinged position moves in an arc around the hinged position rather than revolving on its own axis. For example, the first electric motor is not limited to be disposed at the hinged position where the first clamping rod 161 is hinged with the second clamping rod 162, but can be disposed at any other appropriate positions as long as it allows driving the end of the second clamping rod 162 far away from the hinged position to rotate about the hinged position. Thus, the clamping member can pass through a space between the above-mentioned unwarp portion and the substrate by means of a rotation of the second clamping rod so as to clamp the film to be separated, and can also separate the film to be separated from the substrate under the drive of the mechanical arm. Moreover, after transporting the film to be separated to the waste port, in addition to the relative movement of the stopper and the needle tip in the extension direction of the needle which can separate the film to be separated from the needle tip, it's also possible to restore the second clamping rod to a vertical state by means of a rotation of the second clamping rod, that is, a state where the second clamping rod is parallel to the first clamping rod, so as to prevent the film to be separated from adhering to the clamping member.

Figure 4B:
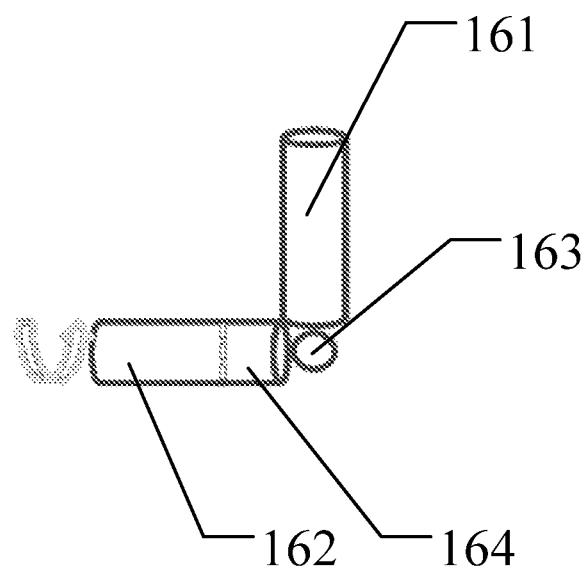
FIG. 4B is a schematic diagram illustrating a clamping member in a film separation apparatus provided by an embodiment according to the present disclosure.

FIG. 4B is a schematic diagram illustrating a clamping member in another film separation apparatus provided by an embodiment according to the present disclosure. As illustrated in FIG. 4B, the clamping member 160 further includes a second electric motor 164; the second electric motor 164 is disposed at an end of the second clamping rod 162 close to the hinged position, and can drive the second clamping rod 162 to revolve on its own axis. After transporting the film to be separated to the waste port, by revolving the second clamping rod, it can further prevent the film to be separated from adhering to the clamping member. It should be explained that, after transporting the film to be separated to the waste port, the revolving and rotation of the second clamping rod can be performed at the same time; that is, it's possible to restore the second clamping rod to the vertical state and meanwhile revolving the second clamping rod, so as to further prevent the film to be separated from adhering to the clamping member.

Figure 5:
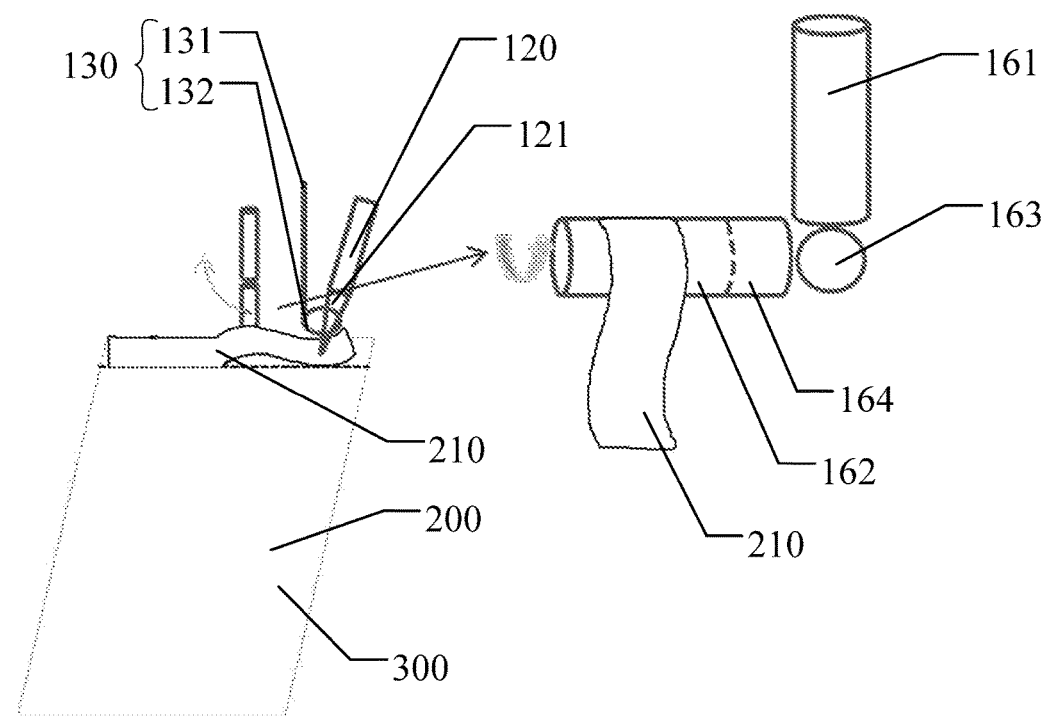
FIG. 5 is a schematic diagram illustrating a working process of a clamping device in a film separation apparatus provided by an embodiment according to the present disclosure.

FIG. 5 is a schematic diagram illustrating a working process of a clamping device in a film separation apparatus provided by an embodiment according to the present disclosure. As illustrated in FIG. 5, when the needle tip 121 is inserted into the film 210 to be separated, the mechanical arm 110 drives the needle 120 to move horizontally so as to cause an upwarp portion or a protrusion in the film 210 to be separated, and then the first electric motor 163 drives the second clamping rod 162 to rotate in an arc around the hinged position where the first clamping rod 161 is hinged with the second clamping rod 162, that is, rotating about the above-mentioned hinged position, so as to drive the second clamping rod 162 to pass through the space between the above-mentioned upwarp portion or protrusion and the substrate 300 to clamp the film 210 to be separated. The mechanical arm 110 drives the needle tip 121 and the second clamping rod 162 to move so as to completely separate the film 210 to be separated from the substrate 300. After the film 210 to be separated is transported to the waste port, the stopper 132 and the needle tip 121 are driven to move with respect to each other in the extension direction of the needle 120, so as to separate the film 210 to be separated from the needle tip 121; the first electric motor 163 drives the second clamping rod 162 to rotate and restore to the vertical state, so as to prevent the film 210 to be separated from adhering to the clamping member 160. Moreover, after the film to be separated is transported to the waste port, revolving the second clamping rod 162 while restoring the second clamping rod 162 to the vertical state, so as to further prevent the film 210 to be separated from adhering to the clamping member 160.

Figure 6:
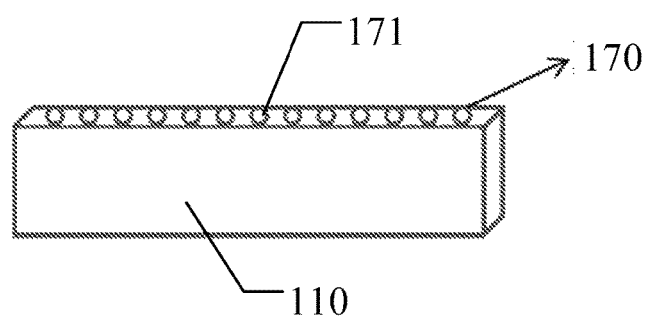
FIG. 6 is a schematic diagram illustrating an adsorption device provided by an embodiment according to the present disclosure.

For example, in some examples, the film separation apparatus 100 can further include an adsorption device 170 which is disposed on the mechanical arm 110 and can generate an adsorption force to adsorb particles. FIG. 6 is a schematic diagram illustrating an adsorption device provided by an embodiment according to the present disclosure; in order to clearly illustrate the adsorption device 170, FIG. 6 omits some components such as the needle, the stopping member and the clamping member. As illustrated in FIG. 6, the adsorption device 170 can include a plurality of adsorption holes 171 which can generate an adsorption force by means of negative pressure. The plurality of adsorption holes 171 are disposed at a side of the mechanical arm 110 close to the film to be separated. In this way, when there are particles at a position of a cuffing line of the film to be separated, the adsorption device can be utilized to remove the particles by the adsorption force while separating the film to be separated, which prevents the particles from dropping onto the substrate and hence can avoid various defects caused by the particles dropping onto the substrate.

For example, the adsorption device can include a vacuum adsorption device.

Figure 7:
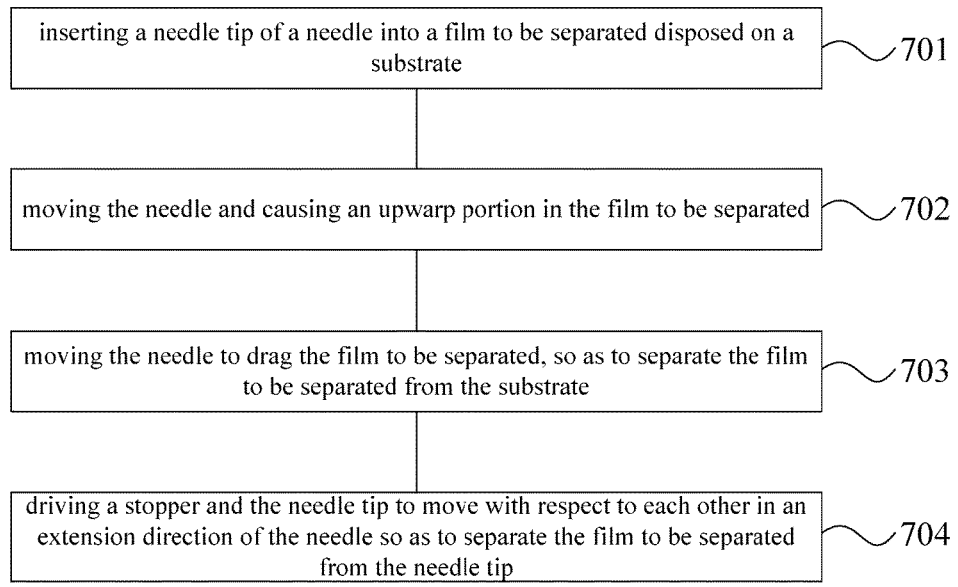
FIG. 7 is a flow chart illustrating a film separation method provided by an embodiment according to the present disclosure.

An embodiment of the present disclosure further provides a film separation method. FIG. 7 is a flow chart illustrating a film separation method provided by an embodiment according to the present disclosure. As illustrated in FIG. 7, the method includes the following steps S701-S704.

Step S701, inserting a needle tip of a needle into a film to be separated disposed on a substrate.

Step S702, moving the needle and causing an upwarp portion in the film to be separated.

Step S703, moving the needle to drag the film to be separated, so as to separate the film to be separated from the substrate.

Step S704, driving a stopper and the needle tip to move with respect to each other in an extension direction of the needle so as to separate the film to be separated from the needle tip.

The film separation method provided by the embodiment of the present disclosure, when used for separating a film (e.g., top protection film) to be separated, firstly can allow the needle tip of the needle to be inserted into the film to be separated, and then drives the needle to move horizontally by the mechanical arm so as to cause an upwarp portion or protrusion in the film to be separated. After separating the film to be separated from the substrate and transporting the same to the waste port, the stopper and the needle tip can be driven to move with respect to each other in the extension direction of the needle so as to separate the film to be separated from the needle tip. In this way, the film separation apparatus can separate the film to be separated from the needle tip by arranging the stopper and by utilizing the relative movement of the stopper and the needle tip in the extension direction of the needle, so as to prevent the film to be separated from adhering to the needle tip and to avoid various defects caused thereby.

For example, in some examples, the film separation method further includes: after moving the needle to cause an upwarp portion in the film to be separated, clamping the upwarp portion by a clamping member. Subsequently, moving the clamping member and the needle tip to drag the film to be separated, so as to separate the film to be separated from the substrate, which ensures a separation of the film to be separated from the substrate by utilizing the clamping member.

For example, in some examples, a minimum distance between the needle tip and the stopper is smaller than 20 mm. In this way, it ensures that the film to be separated on the needle tip can be separated from the needle tip by the stopper.

For example, in some examples, driving the stopper and the needle tip to move with respect to each other in the extension direction of the needle so as to separate the film to be separated from the needle tip includes: driving the needle tip to move along the extension direction of the needle by using a first driving device so that the needle tip moves with respect to the stopper to separate the film to be separated from the needle tip. In other words, the topper is fixed relatively, and the needle tip can move with respect to the stopper under the drive of the first driving device. Because the stopper is fixed relatively, it has simple structure so as to reduce the cost of the film separation method.

For example, in some examples, the stopper includes a stop ring, the extension direction of the needle passes through the stop ring, and the needle tip can pass through the stop ring. In this way, after passing through the stop ring, the needle tip can be inserted into the film to be separated; after retracting the needle tip to a side of the stop ring far away from the film to be separated and holding the needle tip there, the stop ring can block the film to be separated on the needle tip so as to separate the film to be separated from the needle tip, thereby preventing the film to be separated from adhering to the needle tip and avoiding various defects caused thereby.

For example, the above-mentioned stop ring can have a shape including circle, polygon, ellipse and the like.

For example, when the above-mentioned stop ring has a circle shape, a radius of the stop ring is smaller than 20 mm.

For example, driving the stopper and the needle tip to move with respect to each other in the extension direction of the needle so as to separate the film to be separated from the needle tip includes: driving the stopper to move by using a second driving device so that the stopper moves with respect to the needle tip in the extension direction of the needle to separate the film to be separated from the needle tip. In other words, the needle can be fixed relatively, and the stopper can move with respect to the needle tip under the drive of the second driving device.

For example, in some examples, the film separation method can further include: adsorbing particles on the substrate by an adsorption device. In this way, when there are particles at a position of a cutting line of the film to be separated, the adsorption device can be utilized to remove the particles by an adsorption force while separating the film to be separated, which prevents the particles from dropping onto the substrate and hence can avoid various defects caused by the particles dropping onto the substrate.

For example, in some examples, the film separation method further includes: before inserting the needle tip of the needle into the film to be separated disposed on the substrate, cutting a film by using a cutting process to produce the film to be separated.

The following statements should be noted:

(1) The accompanying drawings in the embodiment(s) of the present disclosure involve only the structure(s) in connection with the embodiment(s) of the present disclosure, and other structure(s) can be referred to common design(s).

(2) In case of no conflict, features in one embodiment or in different embodiments of the present disclosure can be combined with each other.

The above are merely specific implementations of the present disclosure without limiting the protection scope of the present disclosure thereto. Any change or replacement that is easily conceivable for those skilled in the art without departing from the technical scope revealed by the present disclosure shall be fallen within the protection scope of the present disclosure. Therefore, the protection scope of the present disclosure should be based on the protection scope of the appended claims.

What is claimed is:

1. A film separation apparatus, comprising:
a mechanical arm;
a needle having one end connected to the mechanical arm and the other end comprising a needle tip; and
a stopping member comprising a connecting rod and a stopper, the connecting rod having one end connected to the mechanical arm and the other end connected to the stopper, wherein
the needle tip is configured to be inserted into a film to be separated, the stopper and the needle tip are configured to move with respect to each other in an extension direction of the needle so as to separate the film to be separated from the needle tip.

2. The film separation apparatus according to claim 1, further comprising a driving device on the mechanical arm, the driving device is configured to drive at least one of the stopper and the needle tip so that the stopper and the needle tip move with respect to each other in the extension direction of the needle.

3. The film separation apparatus according to claim 1, wherein the stopping member is fixed on the mechanical arm, and the film separation apparatus further comprises:

a first driving device on the mechanical arm, the first driving device is configured to drive the needle tip to move along the extension direction of the needle so as to move with respect to the stopper in the extension direction of the needle to separate the film to be separated from the needle tip.

4. The film separation apparatus according to claim 1, wherein the needle is fixed on the mechanical arm, and the film separation apparatus further comprises:

a second driving device configured to drive the stopper to move so as to move with respect to the needle tip in the extension direction of the needle to separate the film to be separated from the needle tip.

5. The film separation apparatus according to claim 4, wherein the second driving device is in the connecting rod, and the second driving device is configured to drive the stopper to move along an extension direction of the connecting rod.

6. The film separation apparatus according to claim 1, wherein a minimum distance between the stopper and the needle tip is smaller than 20 mm.

7. The film separation apparatus according to claim 1, wherein the stopper comprises a stop ring, the extension direction of the needle passes through the stop ring, and the needle tip is configured to be capable of passing through the stop ring.

8. The film separation apparatus according to claim 1, further comprising a clamping member on the mechanical arm, the clamping member is configured to clamp the film to be separated.

9. The film separation apparatus according to claim 8, wherein the clamping member comprises:

a first clamping rod fixed with the mechanical arm;

a second clamping rod hinged with the first clamping rod; and a first electric motor configured to drive one end of the second clamping rod far away from a hinged position to rotate about the hinged position.

10. The film separation apparatus according to claim 9, wherein the first electric motor is at the hinged position where the first clamping rod is hinged with the second clamping rod.

11. The film separation apparatus according to claim 9, wherein the clamping member further comprises:

a second electric motor at one end of the second clamping rod close to the hinged position, the second electric motor is configured to drive the second clamping rod to revolve on its own axis.

12. The film separation apparatus according to claim 1, further comprising:

an adsorption device on the mechanical arm, the adsorption device is configured to generate an adsorption force to adsorb a particle.

13. A film separation method, comprising:

inserting a needle tip of a needle into a film to be separated on a substrate;

moving the needle to cause an upwarp portion in the film to be separated;

moving the needle to drag the film to be separated, so as to separate the film to be separated from the substrate; and driving a stopper and the needle tip to move with respect to each other in an extension direction of the needle so as to separate the film to be separated from the needle tip.

14. The film separation method according to claim 13, further comprising:

after moving the needle to cause an upwarp portion in the film to be separated, clamping the upwarp portion by using a clamping member.

15. The film separation method according to claim 13, wherein driving a stopper and the needle tip to move with respect to each other in an extension direction of the needle so as to separate the film to be separated from the needle tip comprises:

driving the needle tip to move along the extension direction of the needle, so as to move with respect to the stopper to separate the film to be separated from the needle tip.

16. The film separation method according to claim 13, wherein driving a stopper and the needle tip to move with respect to each other in an extension direction of the needle so as to separate the film to be separated from the needle tip comprises:

driving the stopper to move, so as to move with respect to the needle tip in the extension direction of the needle to separate the film to be separated from the needle tip.

17. The film separation method according to claim 11, wherein the stopper comprises a stop ring, the extension direction of the needle passes through the stop ring, and the needle tip passes through the stop ring while the stopper and the needle tip move with respect to each other.

* * * * *